United States Patent
Bugnon et al.

(10) Patent No.: US 9,982,137 B2
(45) Date of Patent: *May 29, 2018

(54) STABILIZATION OF C.I. PIGMENT YELLOW 139

(71) Applicant: BASF SE, Ludwigshafen (DE)

(72) Inventors: Philippe Bugnon, Le Mouret (CH); Karin Karrer, Pfeffingen (CH); Jean Allaz, Kawanishi (JP)

(73) Assignee: BASF SE, Ludwigshafen (DE)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/513,456

(22) PCT Filed: Aug. 14, 2015

(86) PCT No.: PCT/EP2015/068742
§ 371 (c)(1),
(2) Date: Mar. 22, 2017

(87) PCT Pub. No.: WO2016/045872
PCT Pub. Date: Mar. 31, 2016

(65) Prior Publication Data
US 2017/0247545 A1  Aug. 31, 2017

(30) Foreign Application Priority Data
Sep. 23, 2014 (EP) .................................. 14185874

(51) Int. Cl.
C09B 67/00 (2006.01)
C09B 67/18 (2006.01)
(Continued)

(52) U.S. Cl.
CPC ........ *C09B 67/002* (2013.01); *C09B 67/0002* (2013.01); *C09B 67/0089* (2013.01); *C09D 11/037* (2013.01); *C09D 11/322* (2013.01)

(58) Field of Classification Search
CPC .............. C09B 67/002; C09B 67/0002; C09B 67/0089; C09D 11/037; C09D 11/322
See application file for complete search history.

(56) References Cited

U.S. PATENT DOCUMENTS 4,622,391 A  11/1986  Lorenz et al.
4,628,082 A  12/1986  Lorenz et al.
(Continued)

FOREIGN PATENT DOCUMENTS

DE  2 041 999 A1  3/1972
DE  26 28 409 A1  1/1978
(Continued)

OTHER PUBLICATIONS

International Search Report dated Nov. 3, 2015 in PCT/EP2015/068742 filed Aug. 14, 2015.
(Continued)

*Primary Examiner* — Anthony J Green
(74) *Attorney, Agent, or Firm* — Oblon, McClelland, Maier & Neustadt, L.L.P.

(57) ABSTRACT

An alkali-resistant pigment composition is provided comprising (a) a C.I. Pigment Yellow 139 and (b) an adduct containing a compound of formula (II) or a tautomeric form thereof, wherein X is O, S or $NR^1$; Y is O, S or $NR^1$; the group -A-B— is selected from the group consisting of $—CR^2=CR^3—$, $—CR^4R^5—CR^6R^7—$, $—CY—CR^8R^9—$, $—CX—NR^{10}—$, $—CR^{11}=N—$, $—CR^{12}R^{13}—NR^{14}—$ and $R^1$ is hydrogen, $C_1$-$C_8$alkyl, $C_3$-$C_7$cycloalkyl, $C_6$-$C_{10}$aryl or $C_7$-$C_{10}$aralkyl; $R^2$, $R^3$, $R^4$, $R^5$, $R^6$, $R^7$, $R^8$, $R^9$, $R^{10}$, $R^{11}$, $R^{12}$, $R^{13}$ and $R^{14}$ are independently of each other hydrogen, halogen, $C_1$-$C_8$alkyl, $C_2$-$C_8$alkenyl, or $C_6$-$C_{10}$aryl, or $R^2$ and $R^3$ form a benzoannellated ring; and/or a melamine- or pyrimidine-based compound, which is optionally substituted. The pigment composition may be used as colorant in various applications, especially in coloring high molecular weight organic material, for example, coating compositions, paints, printing inks, liquid inks, plastics, films or fibers.

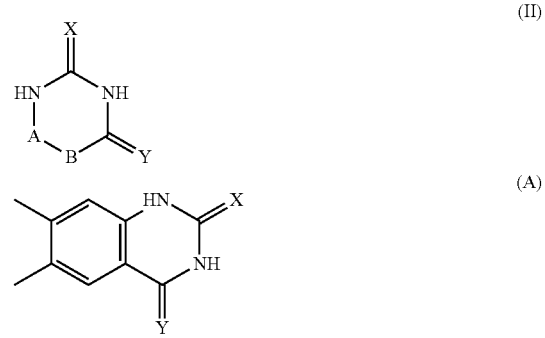

16 Claims, No Drawings

(51) Int. Cl.
  *C09B 67/04* (2006.01)
  *C09B 67/46* (2006.01)
  *C09D 11/037* (2014.01)
  *C09D 11/322* (2014.01)

(56) References Cited

U.S. PATENT DOCUMENTS

| | | |
|---|---|---|
| 6,261,358 B1 | 7/2001 | Sommer et al. |
| 2003/0172847 A1 | 9/2003 | He et al. |
| 2004/0215015 A1 | 10/2004 | Nazarov et al. |
| 2006/0000391 A1 | 1/2006 | Hamada |
| 2007/0020408 A1 | 1/2007 | Feldhues et al. |
| 2007/0020409 A1 | 1/2007 | Feldhues et al. |
| 2007/0151478 A1 | 7/2007 | Erk et al. |
| 2008/0057417 A1 | 3/2008 | Feldhues et al. |
| 2014/0016072 A1 | 1/2014 | Borst et al. |

FOREIGN PATENT DOCUMENTS

| | | |
|---|---|---|
| DE | 30 22 839 A1 | 1/1982 |
| DE | 39 35 858 A1 | 5/1991 |
| EP | 0 485 337 A1 | 5/1992 |
| EP | 0 519 898 A1 | 12/1992 |
| EP | 0 902 061 A2 | 3/1999 |
| EP | 0 994 162 A1 | 4/2000 |
| EP | 0 994 164 A1 | 4/2000 |
| EP | 1 474 484 A1 | 11/2004 |
| EP | 1 612 246 A1 | 1/2006 |
| EP | 2 682 434 A1 | 1/2014 |
| JP | 2005-49635 A | 2/2005 |
| WO | WO 02/10288 A1 | 2/2002 |
| WO | WO 03/064540 A1 | 8/2003 |
| WO | WO 2009/144115 A1 | 12/2009 |

OTHER PUBLICATIONS

Extended European Search Report dated Mar. 11, 2015 in Patent Application No. 14185874.6.

International Preliminary Report on Patentability and Written Opinion dated Apr. 6, 2017 in PCT/EP2015/068742.

International Search Report and Written Opinion dated Nov. 3, 2015 in PCT/EP2015/068742.

John C. Macdonald, et al., "Solid-State Structures of Hydrogen-Bonded Tapes Based on Cyclic Secondary Diamides", Chemical Reviews, vol. 94, Issue 8, 1994, pp. 2383-2420.

Jonathan A. Zerkowski, et al., "Design of Organic Structures in the Solid State: Hydrogen-Bonded Molecular "Tapes"", Journal of the American Chemical Society, vol. 112, Issue 24, 1990, pp. 9025-9026.

STABILIZATION OF C.I. PIGMENT YELLOW 139

This application is a National Stage of PCT/EP2015/068742, which was filed on Aug. 14, 2015. This application is based upon and claims the benefit of priority to European Application No. 14185874.6, which was filed on Sep. 23, 2014.

The present invention relates to an alkali-stable pigment composition comprising a C.I. (Color Index) Pigment Yellow 139 modified by a hydrogen-bonded, stabilized adduct, to a process for preparing the same and the use thereof as a colorant in various applications, especially in coloring high molecular weight organic material, for example, coating compositions, paints, printing inks, liquid inks, plastics, films or fibers.

Isoindoline pigments like Pigment Yellow 139 or Pigment Yellow 185 are normally not stable in alkaline media, i.e., they discolor when they come into contact with or when they are blended with alkaline reacting substances. Pigment Yellow 139 discolors usually from golden yellow to brown, wherein said reaction is further catalyzed by increased temperatures.

EP-A-519898 discloses a process for coloring thermoplastic synthetic materials based on polyolefin homo- and copolymers (LDPE, HDPE, LLDPE, PP and EVA) with an isoindoline pigment, wherein said pigment is stabilized by adding a specific amount of an organic acid, such as stearic acid, citric acid or malic acid, as an acidic reacting additive, which is a stronger acid than the pigment to convert substances which react alkaline with respect to the pigment and which are possibly present in the synthetic material into their acidic form. A stabilized Pigment Yellow 139 is also described in the form of a color concentrate or masterbatch, wherein the pigment, the synthetic material and the acidic reacting additive are molten together. No discoloration is described compared to omitting the acidic reacting additive.

Known surface modifications of pigments, like adsorption of a polymer or a pigment derivative, rosination, inorganic or organic encapsulation and the like, do not satisfy the stability requirements towards alkali yet. Moreover, Pigment Yellow 139 is also sensitive to increased temperatures when used in plastic applications, especially in polyolefin or polyamide applications. When subjecting such plastics to temperatures higher than about 240° C. during manufacturing of mass colored plastic articles, for example, in extrusion processes, often degradation products are generated which undesirably affect the stability of Pigment Yellow 139 and, therefore, the coloristic properties of plastic articles.

Hence, there is a continuing need for an alkali-stable Pigment Yellow 139 which is suitable for use in applications where alkali stability/resistance is required, for example, in exterior-use applications or alkali-containing application media, and/or which is suitable for use in plastic applications when subjected to increased temperatures, for example, used during manufacturing.

Therefore, it is an object of the present invention to provide a pigment composition based on Pigment Yellow 139 exhibiting the desired alkali stability and/or thermal stability in plastic applications, especially polyolefin or polyamide applications, wherein the other performance properties, especially the coloristic properties, are not adversely affected.

Inclusion compounds, intercalation compounds and solid solutions of metal complexes based on azo-barbituric acid or derivatives thereof, such as C.I. Pigment Yellow 150, with various guest compounds have already been described. For example, U.S. Pat. Nos. 4,622,391 or 4,628,082 describes various organic compounds to be embedded in metal complexes based on Pigment Yellow 150, e.g., urea derivatives, surfactants, natural resins or resin acids, water-soluble polymers, or dyestuffs.

Various processes for preparing melamine-hosting pigments based on Pigment Yellow 150 are disclosed, for example, in EP-A-994162 and EP-A-994164. The pigments are described as soft in texture and thus good to disperse in application media. US-A-2008/0057417 discloses a process in order to improve reproducibility, wherein a mixture of mono- and dipotassium complex of azo-barbituric acid with a nickel compound and melamine is reacted. Likewise, US-A-2007/0020408 discloses a process for preparation of such host-guest compounds in the presence of seed crystals, and US-A-2007/0020409 discloses a process for preparation using a heat treatment step in at least two pH stages. For example, Levascreen® Yellow G is a commercially available Pigment Yellow 150 hosting melamine.

It is further known that melamine and cyanuric acid form a solid structure based on strong hydrogen bonds, also described as 1:1 co-crystals by G. M. Whitesides et al. in J. Am. Chem. Soc. 112 (1990), 9025-9026. A variety of similar solid-state structures of hydrogen-bonded tapes based on cyclic secondary diamides have been described by J. C. MacDonald and G. M. Whitesides in Chem. Rev. 94 (1994) 2383-2420.

It has now been found that a pigment composition based on Pigment Yellow 139 having the desired properties may be obtained by modifying said pigment with a hydrogen-bonded, stabilized adduct.

Accordingly, in a first aspect the invention relates to a pigment composition comprising (a) a pigment of formula

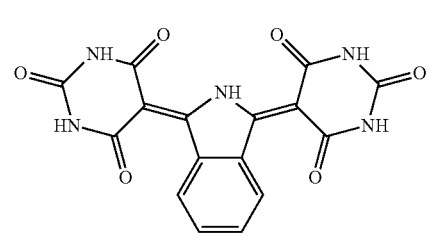

(I)

and (b) an adduct selected from (b1) an adduct containing a compound of formula

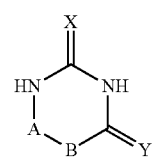

(II)

or a tautomeric form thereof, wherein

X is O, S or $NR^1$, preferably X is O or S;

Y is O, S or $NR^1$;

—A-B— is selected from the group consisting of —$CR^2$=$CR^3$—, —$CR^4R^5$—$CR^6R^7$—, —CY—$CR^8R^9$—, —CX—$NR^{10}$—, —$CR^{11}$=N—, —$CR^{12}R^{13}$—$NR^{14}$— and

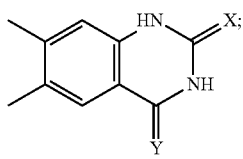

$R^1$ is hydrogen, $C_1$-$C_8$alkyl, $C_3$-$C_7$cycloalkyl, $C_6$-$C_{10}$aryl or $C_7$-$C_{10}$aralkyl;

$R^2$, $R^3$, $R^4$, $R^5$, $R^6$, $R^7$, $R^8$, $R^9$, $R^{10}$, $R^{11}$, $R^{12}$, $R^{13}$ and $R^{14}$ are independently of each other hydrogen, halogen, $C_1$-$C_8$alkyl, $C_2$-$C_8$alkenyl or $C_6$-$C_{10}$aryl, or $R^2$ and $R^3$ form a benzoannellated ring;

each alkyl, cycloalkyl or alkenyl is unsubstituted or substituted with halogen or OH, each aryl or benzoannellated ring is unsubstituted or substituted with halogen, OH or $C_1$-$C_4$alkyl; and a compound of formula

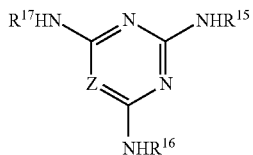

(III)

or a tautomeric form thereof, wherein

Z is N or $CR^{18}$;

$R^{18}$ is hydrogen, $C_1$-$C_8$alkyl, $C_2$-$C_8$alkenyl, $C_6$-$C_{10}$aryl or $C_7$-$C_{10}$aralkyl;

$R^{15}$, $R^{16}$ and $R^{17}$ are independently of each other hydrogen, $C_1$-$C_8$alkyl, $C_6$-$C_{10}$aryl, $C_7$-$C_{10}$aralkyl or a group of formula

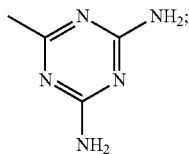

(IV)

each alkyl or alkenyl is unsubstituted or substituted with halogen or OH; and each aryl is unsubstituted or substituted with halogen, OH or $C_1$-$C_4$alkyl; or (b2) an adduct containing a compound of formula

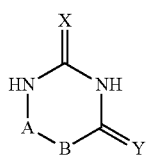

(II)

or a tautomeric form thereof, wherein

X is O, S or $NR^1$, preferably X is O or S;

Y is O, S or $NR^1$;

—A-B— is selected from the group consisting of —$CR^2$=$CR^3$—, —$CR^4R^5$—$CR^6R^7$—, —CY—$CR^8R^9$—, —CX—$NR^{10}$—, —$CR^{11}$=N—, —$CR^{12}R^{13}$—$NR^{14}$— and

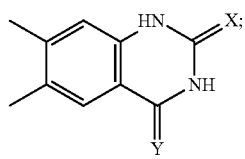

$R^1$ is hydrogen, $C_1$-$C_8$alkyl, $C_3$-$C_7$cycloalkyl, $C_6$-$C_{10}$aryl or $C_7$-$C_{10}$aralkyl;

$R^2$, $R^3$, $R^4$, $R^5$, $R^6$, $R^7$, $R^8$, $R^9$, $R^{10}$, $R^{11}$, $R^{12}$, $R^{13}$ and $R^{14}$ are independently of each other hydrogen, halogen, $C_1$-$C_8$alkyl, $C_2$-$C_8$alkenyl or $C_6$-$C_{10}$aryl, or $R^2$ and $R^3$ form a benzoannellated ring;

each alkyl, cycloalkyl or alkenyl is unsubstituted or substituted with halogen or OH, each aryl or benzoannellated ring is unsubstituted or substituted with halogen, OH or $C_1$-$C_4$alkyl;

or (b3) an adduct containing a compound of formula

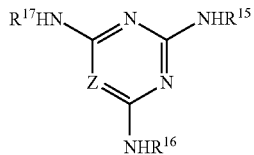

(III)

or a tautomeric form thereof, wherein

Z is N or $CR^{18}$;

$R^{18}$ is hydrogen, $C_1$-$C_8$alkyl, $C_2$-$C_8$alkenyl, $C_6$-$C_{10}$aryl or $C_7$-$C_{10}$aralkyl;

$R^{15}$, $R^{16}$ and $R^{17}$ are independently of each other hydrogen, $C_1$-$C_8$alkyl, $C_6$-$C_{10}$aryl, $C_7$-$C_{10}$aralkyl or a group of formula

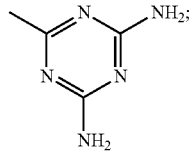

(IV)

each alkyl or alkenyl is unsubstituted or substituted with halogen or OH; and each aryl is unsubstituted or substituted with halogen, OH or $C_1$-$C_4$alkyl.

In a further aspect, the invention relates to a process for preparing the pigment composition, which process comprises treating (a) a pigment of formula (I) with an adduct (b) selected from an adduct (b1), (b2) or (b3), and to a pigment composition, obtainable by said process.

In a further aspect, the invention relates to the use of said pigment composition for coloring a coating composition, a paint, a printing ink, a liquid ink, plastics, a film or a fiber; and to a coating composition, a paint, a printing ink, a liquid ink, plastics, a film or a fiber, which is colored with said pigment composition.

In a further aspect, the invention relates to the use of the adduct (b) selected from an adduct (b1), (b2) or (b3) for enhancing the alkali stability of the pigment of formula (I).

The pigment of formula (I) is listed in the Color Index as C.I. Pigment Yellow 139, herein also referred to as Pigment Yellow 139.

The term "adduct" used herein means a hydrogen-bonded, stabilized adduct, in particular an approximately two-dimensional network of compounds formed by intermolecular hydrogen bonds. The adduct (b) containing a compound of formula (II) or a tautomeric form thereof, and/or a compound of formula (III) or a tautomeric form thereof means an adduct which may be formed by a compound of formula (II) or a tautomeric form thereof, and a compound of formula (III) or a tautomeric form thereof (adduct (b1)); or a compound of formula (II) or a tautomeric form thereof, and optionally a further compound different from a compound of formula (II) or (III) (adduct (b2)); or a compound of formula (III) or a tautomeric form thereof, and optionally a further compound different from a compound of formula (II) or (III) (adduct (b3)).

The terms "a", "an", "the", "at least one", and "one or more" are used interchangeably. Thus, for example, an adduct containing "a" compound of formula (II) means that the adduct include "one or more" compounds of formula (II).

The term "pigment composition" used herein means a composition comprising a pigment of formula (I) and a hydrogen-bonded, stabilized adduct (b) containing a compound of formula (II) and/or a compound of formula (III), wherein said adduct is associated onto the surface of the pigment and/or at least partially intercalated within the chromophore of the pigment, for example, by π-π stacking, hydrogen bonding and/or Van-der-Waals-forces. The pigment composition generally differs from a physically mixed blend of component (a) and (b).

The term "associated" or "modified" used herein in connection with the pigment composition means an interaction between the adduct and the chromophore of the pigment which is non-covalent and non-ionic.

The compound of formula (II) and compound of formula (III) also include the corresponding tautomeric form.

Alkyl, e.g., $C_1$-$C_8$alkyl, $C_1$-$C_4$alkyl or $C_1$-$C_8$alkyl, may be within the given limits of carbon atoms linear or branched, where possible. Examples are methyl (Me), ethyl (Et), n-propyl, isopropyl, n-butyl, s-butyl, isobutyl, t-butyl, n-pentyl, 2-pentyl, 3-pentyl, 2,2-dimethylpropyl, n-hexyl, 1-methylhexyl, n-heptyl, isoheptyl, 1,1,3,3-tetramethylbutyl, 1-methylheptyl, 3-methylheptyl, n-octyl or 2-ethylhexyl. Each alkyl may be unsubstituted or substituted one or more times with OH or Hal.

Alkylene, e.g., $C_1$-$C_8$alkylene, $C_1$-$C_8$alkylene, or $C_1$-$C_4$alkylene, may be derived from above-defined alkyl by abstracting a hydrogen atom from any terminal carbon atom of the alkyl. Examples are methylene, ethylene, n-, isopropylene, n-, iso-, s-, t-butylene, n-pentylene, n-hexylene, n-heptylene or n-octylene. Said alkylene group may contain one or more groups selected from —O—, —S—, —NR²⁰—, phenyl, naphthyl or cyclohexylene, for example 1,4-phenylene, 1,4-naphthylene, 1,5-naphthylene, 2,6-naphthylene or 1,4-cyclohexylene. Preferably, the alkylene group is not interrupted or interrupted by one group. Where the alkylene group contains phenyl, naphthyl or cyclohexylene, these groups may be present at one end or within the chain.

Alkenyl, e.g., $C_2$-$C_8$alkenyl, $C_3$-$C_8$alkenyl, $C_3$-$C_8$alkenyl or $C_3$-$C_4$alkenyl, may be within the given limits of carbon atoms straight-chain or branched, where possible. Examples are vinyl, allyl, methallyl, isopropenyl, 2-butenyl, 3-butenyl, isobutenyl, n-penta-2,4-dienyl or 3-methyl-but-2-enyl. The term "alkenyl" also comprises residues with more than one double bond that may be conjugated or non-conjugated, for example, may comprise one double bond. Each alkenyl may be unsubstituted or substituted one or more times with OH or Hal. Alkenylene, e.g., $C_2$-$C_8$alkenylene or $C_2$-$C_4$alkylene, may be derived from above-defined alkenyl by abstracting a hydrogen atom from any terminal carbon atom of the alkenyl.

Cycloalkyl, e.g., $C_3$-$C_7$cycloalkyl or $C_5$-$C_7$cycloalkyl, may be within the given limits of carbon atoms cyclopropyl, cyclobutyl, cyclopentyl, cyclohexyl, cycloheptyl, methylcyclopentyl, dimethylcyclopentyl or methylcyclohexyl, preferably cyclohexyl. Each cycloalkyl may be unsubstituted or substituted one or more times with OH or Hal. Cycloalkylene, e.g., $C_3$-$C_7$cycloalkylene, or $C_5$-$C_7$cycloalkylene, may be derived from above-defined cycloalkyl by abstracting a hydrogen atom from any carbon atom of the cycloalkyl. 1,4-Cyclohexylene is preferred.

Aryl, e.g., $C_6$-$C_{10}$aryl, may be within the given limits of carbon atoms phenyl, 1-naphthyl or 2-naphthyl, preferably phenyl. Each aryl may be unsubstituted or substituted one or more times with Hal, OH or $C_1$-$C_4$alkyl. Arylene, e.g. $C_6$-$C_{10}$arylene, may be 1,4-phenylene, 1,4-naphthylene, 1,5-naphthylene or 2,6-naphthylene, preferably p-phenylene.

Aralkyl, e.g., $C_7$-$C_{10}$aralkyl, may be within the given limits of carbon atoms benzyl, 2-benzyl-2-propyl, β-phenylethyl (phenethyl), α,α-dimethylbenzyl or ω-phenylbutyl, wherein both the aliphatic and the aromatic hydrocarbon group may be unsubstituted or substituted. The aromatic part may be substituted one or more times with Hal, OH or $C_1$-$C_4$alkyl; the aliphatic part may be substituted with OH or Hal. Preferred examples are benzyl or phenethyl.

Halogen (Hal) denotes I, Br, Cl, or F, preferably F or Cl on alkyl and Cl or Br on aryl.

The term "substituted" means "substituted one or more times with", that is 1 to 3 times, where possible, preferably 1 or 2 times, more preferably 1. If a substituent occurs more than once in a group, it may be different in each occurrence.

Of particular interest is a pigment composition containing
(a) a pigment of formula (I) and an adduct (b1), as described herein-before.

A suitable adduct of component (b) may also be formed by the compound of formula (III) and any dicarboxylic acid.

Accordingly, in a preferred embodiment, the pigment composition comprises (b3) the adduct containing the compound of formula (III), as defined in any aspect herein, or a tautomeric form thereof, and a compound of formula

$$HOOC-R^{19}-COOH \qquad (V),$$

wherein
$R^{19}$ is a direct bond, $C_1$-$C_8$alkylene, $C_2$-$C_8$alkenylene, $C_3$-$C_7$cycloalkylene or $C_6$-$C_{10}$arylene;
said alkylene, cycloalkylene or alkenylene is unsubstituted or substituted with halogen or OH, and said alkylene may further be interrupted by O, S, $NR^{20}$, phenyl, naphthyl or cyclohexylene,
said arylene is unsubstituted or substituted with halogen, OH or $C_1$-$C_4$alkyl; and
$R^{20}$ is hydrogen or $C_1$-$C_4$alkyl.

Preferably, $R^{19}$ is a direct bond, $C_1$-$C_6$alkylene, $C_2$-$C_4$alkenylene, cyclohexylene or $C_6$-$C_{10}$arylene; said groups are especially unsubstituted or substituted with OH, in particular a direct bond or $C_1$-$C_4$alkylene.

Suitable examples may be oxalic acid, malonic acid, succinic acid, glutaric acid, adipic acid, pimelic acid, and octanedioic acid, maleic acid, fumaric acid, tartraric acid and terephthalic acid, especially oxalic acid, malonic acid, succinic acid, glutaric acid, adipic acid, tartraric acid and terephthalic acid.

In a preferred aspect, the adduct (b) is selected from an adduct containing
- a compound of formula (II) (adduct (b2)), or
- a compound of formula (II) and a compound of formula (III) (adduct (b1)), or
- a compound of formula (III) and a compound of formula (V) (adduct (b3)), each compound as described in any aspect herein.

The compound of formula (II) may include one or more compounds of formula (II), preferably one compound of formula (II). Accordingly, the same applies to the compound of formula (III) or (V).

A preferred compound of formula (II) is of formula (II), wherein X and Y are O; X and Y are S; X is S and Y is O; X is NH and Y is O; or X is O and Y is NH; more preferably X and Y are O.

A further preferred compound of formula (II) is of formula (II), wherein the group —A-B— is selected from the group consisting of —CR$^2$=CR$^3$—, —CR$^4$R$^5$—CR$^6$R$^7$—, —CY—CR$^8$R$^9$—, —CX—NR$^{10}$—, —CR$^{11}$=N—, —CR$^{12}$R$^{13}$—NR$^{14}$— and

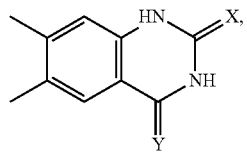

wherein
R$^2$, R$^3$, R$^4$, R$^5$, R$^6$, R$^7$, R$^8$, R$^9$, R$^{10}$, R$^{11}$, R$^{12}$, R$^{13}$ and R$^{14}$ are independently of each other hydrogen, halogen, C$_1$-C$_4$alkyl, C$_3$-C$_4$alkenyl, or C$_6$-C$_{10}$aryl, more preferably hydrogen, methyl, ethyl or phenyl; or
R$^2$ and R$^3$ form a benzoannellated ring.

Preferably, —CR$^2$=CR$^3$— is a group, wherein R$^2$ and R$^3$ are independently of each other H, methyl, ethyl, F, Cl, Br, or I; or R$^2$ and R$^3$ form a benzoannellated ring. Suitable groups of —CR$^2$=CR$^3$— are selected from —CH=CH—, —C(Me)=C(Et)—, —C(Et)=C(Me)—, —C(Hal)=CH— or

Further preferably, —CR$^4$R$^5$—CR$^6$R$^7$— is a group, wherein R$^4$, R$^5$, R$^6$ and R$^7$ are independently of each other H, methyl, ethyl, F, Cl, Br or I. Suitable groups of —CR$^4$R$^5$—CR$^6$R$^7$— are selected from —CH$_2$—CH$_2$—, —CH(Me)-CH$_2$— or —CH(Et)-CH$_2$—.

Further preferably, —CY—CR$^8$R$^9$— is a group, wherein Y is O or NH; and R$^8$ and R$^9$ are independently of each other H, C$_1$-C$_6$alkyl, C$_3$-C$_4$alkenyl, benzyl or phenyl, especially H, methyl, ethyl, isopropyl, allyl, benzyl or phenyl. Suitable groups are —CO—CH$_2$—, —CO—C(Me)$_2$—, —CO—C(Et)$_2$—, —CO—CH(Me)—, —CO—CH(Et)—, —CO—C(Me)(Ph)—, —CO—C(Et)(Ph)—, —CO—CBr$_2$— or —C(NH)—CH$_2$—.

Further preferably, —CX—NR$^{10}$— is a group, wherein X is O; and R$^{10}$ is H or C$_1$-C$_6$alkyl, more preferably H, methyl, ethyl, isopropyl, n-butyl or isobutyl.

Further preferably, —CR$^{11}$=N— is a group, wherein R$^{11}$ is H, methyl or ethyl, especially H.

Further preferably, —CR$^{12}$R$^{13}$—NR$^{14}$— is a group, wherein R$^{12}$, R$^{13}$ and R$^{14}$ are independently of each other H, methyl or ethyl, especially H.

Especially suitable compounds of formula (II) are selected from

(IIa)

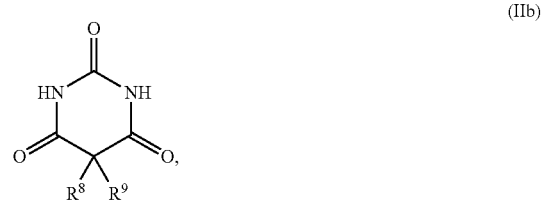

(IIb)

(IIc)

(IId)

(IIe)

(IIf)

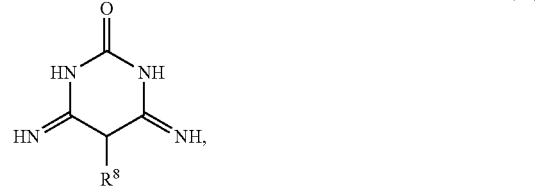

(IIf)

wherein R$^8$ is H, methyl, ethyl, isopropyl, allyl, benzyl or phenyl, or

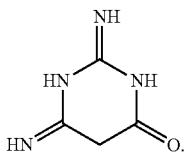
(IIg)

A preferred compound of formula (III) is of formula (III), wherein Z is N or $CR^{18}$, wherein $R^{18}$ is hydrogen, $C_1$-$C_4$alkyl or phenyl, more preferably hydrogen, methyl, ethyl or phenyl; and $R^{15}$, $R^{16}$ and $R^{17}$ are independently of each other hydrogen, $C_1$-$C_6$alkyl, phenyl, 1-naphthyl, benzyl or a group of formula

(IV)

said phenyl or naphthyl is unsubstituted or substituted with Cl, Br, I, methyl or ethyl; more preferably $R^{15}$ is hydrogen, and $R^{16}$ and $R^{17}$ are the same and are $C_1$-$C_4$alkyl or phenyl, wherein said phenyl is optionally substituted.

Especially suitable compounds of formula (III) are selected from

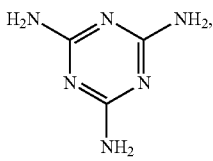
(IIIa)

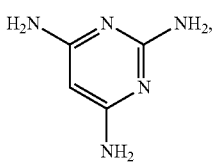
(IIIb)

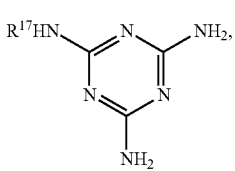
(IIIc)

wherein $R^{16}$ and $R^{17}$ are $C_1$-$C_4$alkyl or phenyl, or

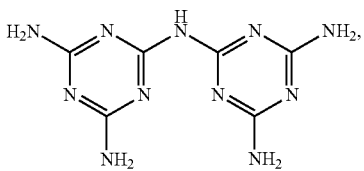
(IIId)

Accordingly, in a preferred embodiment, the pigment composition comprises (b1) the adduct containing the compound of formula (II) or a tautomeric form thereof,
wherein X and Y are O; —A-B— is —CY—$CR^8R^9$— or —CX—$NR^{10}$—;
$R^8$, $R^9$ and $R^{10}$ are hydrogen; and
the compound of formula (III) or a tautomeric form thereof, wherein
Z is N; and $R^{15}$, $R^{16}$ and $R^{17}$ are independently of each other hydrogen or $C_1$-$C_4$alkyl.

In a further preferred embodiment, the pigment composition comprises
(b1) the adduct containing the compound of formula (II) or a tautomeric form thereof, wherein X and Y are O; —A-B— is —CY—$CR^8R^9$— or —CX—$NR^{10}$—;
$R^8$, $R^9$ and $R^{10}$ are hydrogen; and
the compound of formula (III) or a tautomeric form thereof, wherein
Z is $CR^{18}$; $R^{18}$ is hydrogen, $C_1$-$C_4$alkyl, phenyl or $C_7$-$C_{10}$aralkyl; and
$R^{15}$, $R^{16}$ and $R^{17}$ are independently of each other hydrogen or $C_1$-$C_4$alkyl.

In a further preferred embodiment, the pigment composition comprises
(b1) the adduct containing the compound of formula (II) or a tautomeric form thereof, wherein X and Y are O; —A-B— is —CY—$CR^8R^9$— or —CX—$NR^{10}$—;
$R^8$, $R^9$ and $R^{10}$ are hydrogen; and
the compound of formula (III) or a tautomeric form thereof, wherein
Z is N or $CR^{18}$; $R^{18}$ is hydrogen, $C_1$-$C_4$alkyl, phenyl or $C_7$-$C_{10}$aralkyl; and
$R^{15}$, $R^{16}$ and $R^{17}$ are independently of each other hydrogen or $C_1$-$C_4$alkyl.

In a further preferred embodiment, the pigment composition comprises
(b1) the adduct containing the compound of formula (II) or a tautomeric form thereof, wherein X and Y are O; —A-B— is —CY—$CR^8R^9$— or —CX—$NR^{10}$—;
$R^8$, $R^9$ and $R^{10}$ are hydrogen; and
the compound of formula (III) or a tautomeric form thereof,
wherein Z is N; and $R^{15}$, $R^{16}$ and $R^{17}$ are hydrogen.

In a further preferred embodiment, the pigment composition comprises
(b1) the adduct containing the compound of formula (II) or a tautomeric form thereof, wherein X and Y are independently of each other O or $NR^1$; —A-B— is —CY—$CR^8R^9$—;
$R^1$, $R^8$, $R^9$ and $R^{10}$ are hydrogen; and
the compound of formula (III) or a tautomeric form thereof,
Z is N or $CR^{18}$; $R^{18}$ is hydrogen, $C_1$-$C_4$alkyl, phenyl or $C_7$-$C_{10}$aralkyl; and
$R^{15}$, $R^{16}$ and $R^{17}$ are independently of each other hydrogen or $C_1$-$C_4$alkyl.

A suitable adduct of component (b2) may also be formed by only a compound of formula (II), for example, by one or more compounds of formula (II), preferably by one compound of formula (II).

Accordingly, a preferred pigment composition contains the adduct (b2) which is formed of a compound of formula (II) or a tautomeric form thereof, wherein
X and Y are O;
—A-B— is selected from the group consisting of —$CR^2$=$CR^3$—, —CY—$CR^8R^9$— and —CX—$NR^{10}$—;
$R^2$, $R^3$ and $R^{10}$ are hydrogen; and $R^8$ and $R^9$ are independently of each other hydrogen, halogen or $C_1$-$C_4$alkyl.

Also preferred is a pigment composition containing the adduct (b2) which is formed of a compound of formula (II) or a tautomeric form thereof, wherein X and Y are independently of each other O or $NR^1$;

—A-B— is selected from the group consisting of —$CR^2$=$CR^3$—, —CY—$CR^8R^9$— and —CX—$NR^{10}$—;

$R^1$, $R^2$, $R^3$ and $R^{10}$ are hydrogen; and $R^8$ and $R^9$ are independently of each other hydrogen, halogen or $C_1$-$C_4$alkyl.

More preferred is a pigment composition, wherein the adduct (b2) is formed of a compound of formula (II) or a tautomeric form thereof, wherein X and Y are O, —A-B— is selected from the group consisting of —CY—$CR^8R^9$— and —CX—$NR^{10}$—;

$R^8$, $R^9$ and $R^{10}$ are hydrogen.

Especially preferred examples for forming the adduct are of formula (IIa), (IIb), (IIc) or (IIf), in particular (IIa) or (IIb).

A further suitable adduct of component (b) may also be formed by only a compound of formula (III), preferably by a compound of formula (IIIa). However, this embodiment is less preferred.

Especially preferred adducts are formed by a compound of formula (IIa) and a compound of formula (IIIa); or a compound of formula (IIa) and a compound of formula (IIIb); or a compound of formula (IIb) and a compound of formula (IIIa); or a compound of formula (IIb) and a compound of formula (IIIb); or a compound of formula (IIa); or a compound of formula (IIb).

Advantageously, the adduct is formed of only one compound or of two different compounds. Thus, the adduct preferably consists essentially of a compound of formula (II) or a compound of formula (III). Alternatively, the adduct is preferably a mixed adduct consisting essentially of a compound of formula (II) and a compound of formula (III), or a compound of formula (III) and a compound of formula (V). This means that the adduct may only contain other substances in an amount of 0 to 5 wt %, based on the total weight of component (b), preferably 0 to 3% by weight.

A mixture of more than one adduct described herein may also be used to form a pigment composition of the invention.

In principle, any adduct described as solid-state structures based on secondary diamides by J. C. MacDonald and G. M. Whitesides in Chem. Rev. 94 (1994) 2383-2420 may be used in the instant invention. The compounds of formula (II), (III) or (V) are, for example, commercially available or may be synthesized by general methods known in the art, for example, as disclosed in the references cited in Chem. Rev. 94 (1994) 2383-2420.

In a further aspect, the invention relates to a process for preparing a pigment composition, as defined in any aspect herein-before, which process comprises treating (a) a pigment of formula (I) with an adduct (b) selected from an adduct (b1), (b2) or (b3).

As a pigment of formula (I) any crude Pigment Yellow 139 may be used for preparing the pigment composition of the invention. The crude pigment may be obtained by any process known to one skilled in the art. For example, as disclosed in DE-A-2628409 and DE-A-2041999, diiminoisoindoline may be obtained by introducing gaseous ammonia in a suspension containing o-phthalodinitrile, followed by adding the resulting suspension to a mixture of barbituric acid, water, formic acid and a surfactant under heating. DE-A-3022839 describes a process by reacting 1-amino-3-cyanimino isoindolenine with two equivalents of barbituric acid in water. DE-A-3935858 describes a process, wherein phthalodinitrile is reacted with a base in an alcohol followed by condensation with a mixture of barbituric acid, water and formic acid without isolating the intermediate. The crude pigment may be used, as directly obtained after synthesis, as a wet cake or after isolating usually by filtering, washing and drying, dependent on the subsequent treating or finishing step. A wet cake may comprise 30 to 60% by weight of pigment, based on the total weight of the wet cake. Moreover, an already finished pigment may be used, for example, finished by commonly used methods for conditioning isoindoline pigments. Alternatively, any commercially available Pigment Yellow 139 may be used.

Preferably, the crude pigment as isolated by filtering, washing and drying is used.

The adduct containing the compound of formula (II) and/or the compound of formula (III) may be prepared in situ during the treating step of the pigment of formula (I) or may be prepared separately to be added to the pigment of formula (I) to form the pigment composition.

In case the adduct is formed of two different compounds, e.g., a compound of formula (II) and a compound of formula (III), the adduct is suitably prepared prior to adding to the pigment of formula (I). The adduct is suitably prepared by dissolving each compound separately in water followed by blending the solutions under stirring until a precipitate has been formed. Dissolving may be carried out at room temperature or at an elevated temperature, for example, up to 60° C. Blending the solutions may be carried out both at room temperature and at temperatures up to 60° C. to form the adduct as a precipitate. The precipitate is generally isolated by filtering and washing, usually with water. The adduct may be used after drying at temperatures of from 20 to 100° C., preferably 60 to 90° C. or as a wet cake dependent on the subsequent treating or finishing step of the pigment of formula (I).

Usually, the mole ratio of compound of formula (II) to compound of formula (III) may be in the range of 0.4:0.6 to 0.7 to 0.3, preferably about 0.45:0.55 to 0.70:0.30, more preferably 0.45:0.55 to 0.55:0.45. Most preferably, the mole ratio is about 1:1.

Usually, the mole ratio of compound of formula (III) to compound of formula (V) may be in the range of 0.4:0.6 to 0.7:0.3, preferably about 0.45:0.55 to 0.70:0.30, more preferably 0.45:0.55 to 0.55:0.45. Most preferably, the mole ratio is about 1:1.

The process for preparing the instant pigment composition may be performed by subjecting a blend of the pigment of formula (I) and the adduct containing the compound of formula (II) and/or the compound of formula (III) as such to a comminution step or a dispersing step, usually involving high energy including milling media.

Accordingly, in a preferred aspect, the invention relates to a process, wherein the pigment of formula (I) is treated with the adduct (b) using salt kneading, wet milling or dispersing, preferably with high energy including milling media, wherein optionally the adduct (b) is prepared in situ during the treating step.

The weight ratio of pigment of formula (I) (component (a)) to the adduct used for preparing the pigment composition of the present invention (component (b)) may be in the range of from 0.85:0.15 to 0.5:0.5, preferably 0.80:0.2 to 0.65:0.35. The weight ratio used for the process of preparation usually corresponds to the weight ratio of the pigment composition of the invention. In case the adduct is prepared in situ the compounds forming the adduct of component (b) may be suitably added in excess up to 20% by weight, based on the pigment of formula (I), preferably up to 10% by weight. The compounds not forming an adduct may easily be separated by washing. The amount of the adduct present in the pigment composition of the invention may be calculated, for example, by weighing of the dried pigment (corresponding to the yield) or determined by elemental analysis.

Preferably, the comminution step may be carried out by salt kneading or wet milling.

Salt kneading may be carried out in the presence of an inorganic salt or a salt of an organic acid and an organic liquid in which the pigment, adduct and inorganic salt or salt of an organic acid are substantially insoluble. Any kneader for salt kneading known in the art may be used, for example, common double-shaft kneaders, such as Z-blade kneaders, planetary kneaders or screw kneaders, but also single-shaft kneaders, high speed mixers or extruders are likewise possible. The pigment of formula (I) and the adduct are preferably used in dried form, each having residual amounts of liquids of up to 5% by weight, based on the pigment and adduct, respectively.

Suitable salts for salt kneading are water-soluble salts having a solubility of at least 10 g/100 ml in water. Suitable examples are sodium chloride, potassium chloride, calcium chloride, zinc chloride, aluminum chloride, sodium sulfate, aluminum sulfate, calcium carbonate, sodium acetate, calcium acetate, sodium citrate, potassium sodium tartrate and the like, with or without water of crystallization. Preferred inorganic salts are sodium chloride and sodium sulfate, more preferably sodium chloride. Typically, technical-grade salts with or without preceding micronization are used. The salts preferably have an average particle size of from 5 to 200 µm, more preferably from 10 to 50 µm. In addition, they appropriately only have a solubility of ≤100 mg/l, in particular ≤10 mg/l (in each case at 20° C.), in the organic solvent; they are preferably virtually insoluble therein.

Suitable liquids for use in salt kneading are liquids, preferably organic solvents or low low-melting solids that liquefy during grinding, in which the organic pigment and salt are substantially insoluble but which enable the physical transformation of the crude pigment to the instant pigment composition. Examples of organic solvents are alcohols, such as methanol, ethanol, (di, tri)ethylene glycol, (di) propylene glycol, or glycerol; lower organic acids, such as formic or acetic acid; ethers such as dioxane, tetrahydrofuran, ethylene glycol monoethyl or diethyl ether, ethylene glycol monobutylether, or oligo- and polyglycol ethers; ketones such as acetone, diacetone alcohol, cyclohexanone or methyl ethyl ketone, aromatics, such as toluene, xylene, chlorobenzene, nitrobenzene, or chloronaphthalene; esters such as butyl acetate, glycerol triacetate, methyl benzoate, dimethylphthalate or methyl salicylate; amides, such as dimethylformamide, dimethylacetamide or N-methylpyrrolidone; sulfones such as sulfolane or sulfoxides such as dimethyl sulfoxide. Particularly suitable solvents are diethylene glycol, triethylene glycol or diacetone alcohol.

In general, the kneading mass contains, per g of the total mass of pigment of formula (I) and adduct, or pigment of formula (I) and compound(s) forming the adduct of component (b) in situ, from 1 to 15 g, preferably from 2 to 8 g of inorganic salt or salt of an organic acid, and from 0.3 to 2 g, preferably from 0.5 to 2 g, of organic liquid.

The kneading temperature is generally of from 20 to 150° C., preferably 30 to 110° C., more preferably 30 to 90° C.

The salt kneading step should be carried out for a sufficient period of time to allow the particles to attain optimum stability, pigmentary size and distribution. The period of time is not critical and may range from 2 to 15 hours, preferably 2 to 10 hours, in particular from 2 to 6 hours.

The speed or rotation rate is appropriately selected in such a way that the kneading mass is moved homogeneously and with uniform shear.

The product resulting after kneading may be stirred and granulated in water to remove salt and organic liquid and isolated by common methods, like filtering, washing usually salt free with water and drying, preferably at a temperature of from 50 to 90° C.

Wet milling may be carried out in the presence of milling media and an aqueous medium, preferably water, in which the pigment (a) and the adduct are substantially insoluble. Any milling apparatus may be used insofar as it permits temperature control and application of high shear. Suitable milling apparatus are pearl mills, ball mills, vibrator mills, sand mills, agitator mills, centrifugal vortex mills, attritors, and the like. Suitable milling media are, for example, steel balls, ceramic beads like silicon/aluminum/zirconium oxide beads or yttrium stabilized zircon pearls, or glass beads typically having a diameter of from 0.2 to 3 mm, preferably 0.3 to 1.8 mm.

For safety reasons, it may be advantageous to carry out the milling under inert atmosphere.

Wet milling may preferably be carried out in an aqueous medium, preferably water. Suitable organic solvents for the aqueous medium are in principle the solvents mentioned for salt kneading, preferably water-miscible solvents.

The total amount of pigment of formula (I) and adduct or the compound(s) forming the adduct of component (b) in the aqueous medium is advantageously of from 5 to 25% by weight, based on the total weight of the milled paste, preferably 5 to 15% by weight. Preferably, the pigment of formula (I) is pre-dispersed in the aqueous medium, preferably water, to form a uniform aqueous dispersion, typically of from 0.5 to 2 hours, prior to the step of wet grinding. The adduct or the compound(s) forming the adduct of component (b) may be present during pre-dispersing or may be added after the pigment of formula (I) has been pre-dispersed. The pre-dispersing step may be carried out in any suitable dispersing apparatus known in the art for dispersing pigments like any dissolvers or the like. Typically, dispersing is operated at a speed of from 800 to 3000 rpm dependent on the viscosity of the dispersion medium, usually without milling media.

The milling temperature is generally of from 10 to 100° C., preferably 20 to 80° C.

The speed or rotation rate is appropriately selected in such a way that the milling mass is moved homogeneously and with uniform shear. The milling step may be operated in a circulation or single/multi-pass procedure.

The milling step should be carried out for a sufficient period of time to allow the particles to attain optimum stability, pigmentary size and distribution, typically dependent on the mode of operation. The period of time is not critical and may range from 30 min to 15 hours, preferably 1 to 10 hours, in particular from 2 to 5 hours.

The product resulting after wet milling may be isolated by common methods, like filtering, washing usually with water and drying, preferably at a temperature of from 50 to 90° C.

If desired, the milled material obtained in the case of milling with steel balls may be subjected to an after-treatment with hydrochloric acid to remove any iron attritus present.

Alternatively, the pigment composition of the invention may be obtained by conventional dry-milling or by a high energy powder grinding, for example, in a jet mill such as opposed fluidized jet mill.

Also preferably, the pigment composition may be prepared by dispersing the pigment of formula (I) with the already formed adduct or the compound(s) forming the adduct of component (b). Dispersing may be carried out in an aqueous medium, preferably in water. Suitable organic solvents for the aqueous medium are in principle the solvents mentioned for salt kneading, preferably water-miscible solvents.

The dispersing step is generally carried out with any dispersing apparatus using milling media. Such dispersing differs from the usual pre-dispersing step for providing a homogenous dispersion.

Suitable dispersing apparatus may any dissolver or paint shaker known in the art for dispersing pigments. For example, a dissolver of the type DISPERMAT or a paint shaker of the type Skandex may be used. Typically, dispersing is operated at a speed of from 800 to 10,000 rpm, preferably 1000 to 3000 rpm, dependent on the viscosity of the dispersion medium. The dispersing step is carried out with any milling media, preferably with milling media like glass beads or ceramic beads typically having a diameter of from 0.3 to 2 mm, preferably 0.8 to 2 mm.

The total amount of pigment of formula (I) and adduct or the compound(s) forming an adduct of component (b) in the aqueous medium is advantageously of from 5 to 25% by weight, based on the total weight of the dispersed paste, preferably 5 to 15% by weight.

Dispersing is usually carried out of from 10 to 100° C., preferably 20 to 80° C.

The speed or rotation rate is appropriately selected in such a way that the dispersing mass is moved homogeneously and with uniform shear.

The dispersing step should be carried out for a sufficient period of time to allow the particles to attain optimum stability, pigmentary size and distribution, typically dependent on the mode of operation. The period of time is not critical and may range from 30 min to 15 hours, preferably 1 to 10 hours, in particular from 3 to 7 hours.

The product resulting after dispersing may be isolated by common methods, like filtering, washing usually with water and drying, preferably at a temperature of from 50 to 90° C.

The pigment composition may be prepared by the processes, as described herein-before. Especially suitable is the process, wherein (a) the pigment of formula (I) is treated with an adduct (b) by salt kneading or wet milling, in particular by salt kneading. Optionally, the adduct (b) may be prepared in situ during the treating step.

In a further aspect, the invention relates to a pigment composition obtainable by the process, as defined herein-before. Accordingly, the invention relates to a pigment composition, as defined in any aspect herein-before, obtainable by a process, which process comprises treating (a) a pigment of formula (I) with (b) an adduct selected from an adduct (b1), (b2) or (b3).

The pigment composition of the invention may be used as solid systems of free-flowing, pulverulent consistency, as granules, or as aqueous presscake, preferably as powder or granules.

In order to control, for example, the crystal size it may be of advantage to carry out the process for preparing the instant pigment composition in the presence of a pigment synergist, in which case the pigment is used typically in an amount of from 0.01 to 0.1 g of synergist per gram of the pigment of formula (I) is used. The pigment synergist may be added at any stage of the preparation process as well as in the course of synthesis of the crude pigment. The pigment composition may also only be mixed with the pigment synergists for the application.

Pigment synergists are compounds which contain some or all of the pigment chromophore in their molecular structure and preferably have acidic or basic groups, for example, aminomethyl, sulpho, carboxyl, amidosulphonyl or amidocarbonyl groups. The structure of the pigment system does not have to coincide with the structure of pigment (a). Examples of suitable pigment synergists are copper phthalocyanine derivatives such as Solsperse® 5000 or 12000 (Lubrizol Corp., USA), or BYK's synergist 2100, or azo derivatives such as Solsperse 22000 and Synergist 2105. Further suitable examples are pyrazole-containing pigment derivatives, for example, as disclosed in EP-A-0485337, or quinophthalone derivatives, for example, as described in US-A-2003/0172847; perylene based pigment derivatives, as disclosed, for example, in US-A-2007/0151478 or US-A-2004/0215015, and derivatives, as disclosed, for example, in WO-A-02/10288 or WO-A-2009/144115.

The presence of pigment synergists often has a positive effect on the dispersibility and the flocculation stability of the instant pigment composition in the application medium and thus on the rheology of the application medium, for example, of a paint system.

The pigment composition of the invention may be after-treated by common methods such as contacting with suitable additives such as surfactants, dispersants, resins, waxes, fillers, defoamers, antidust agents, extenders, shading colorants, preservatives, dryness retarders, rheology control additives, wetting agents, antioxidants, UV absorbers, light stabilizers or combinations thereof. Suitably, an after-treatment by rosination may be performed.

Such an after-treatment may also be omitted entirely.

Preferably, the pigment composition of the invention consists essentially of components (a) and (b). The amount of optional components like the above-mentioned additives and pigment synergists may be of from 0 to 20% by weight, based on the total weight of the pigment composition, preferably 0 to 10% by weight, more preferably 0 to 5% by weight.

The pigment composition of the invention may also be used in form of a pigment preparation, as disclosed, for example, in EP-A-902061 or EP-A-1474484.

The pigment composition of the invention is outstandingly suitable for all pigment end-use applications, especially coloring high molecular weight organic or inorganic materials of natural and synthetic origin, for example, a) for mass coloring polymers, e.g. in the form of resins, rubber or plastics including films and fibers;

b) for the preparation of paints, paint systems, coating compositions, for example, in automotive and industrial coating compositions, c) liquid and printing inks, e.g. digital printing like ink-jet printing, as well as for toners in electrophotography, e.g. for laser printers;

d) as an additive to colorants, such as pigments and dyes; and the like.

Paints are aqueous or solvent borne coating materials and also powder coating materials, in which the pigment composition of the invention may be employed alone or in combination with extenders, white pigments, chromatic pigments or black pigments. Organic film-forming binders that may be used include all of the binders that are usual in the coatings sector. Examples of binder materials which may be colored with the pigment composition of the invention include more particularly:

oil-based materials (based on linseed oil or polyurethane oils),
cellulose-based materials (NC, CAB, CAP),
materials based on chlorinated rubber,
vinyl materials (based on PVC, PVDF, VC copolymer, polyvinyl acetate, polyvinyl ester dispersion, polyvinyl alcohol, polyvinyl acetal, polyvinyl ether, polystyrene, styrene copolymers),
acrylic materials,
alkyd materials,
saturated polyester materials,
unsaturated polyester materials,
polyurethane materials (one pack, two pack),
epoxy materials,
silicone materials.

The systems are described in detail in D. Stoye, W. Freitag, Paints, Coatings and Solvents, Second Edition, 1998, Wiley-VCH.

Combinations with effect pigments are also possible and lead to special effects. Effect pigments include platelet-shaped metallic and/or oxidic effect pigments, generally known in the art.

Preferably, the pigment composition is used in waterborne and solvent borne coating applications, more preferably in decorative coating compositions like architectural, automotive or industrial coating compositions.

Also preferably, the pigment composition is used in waterborne and solvent borne printing inks based on various binder materials, as mentioned herein-before for coating applications, preferably for ink-jet printing.

The pigment composition of the invention may also advantageously be used to color customary plastics and blends of plastics, either as pigment composition alone or in combination with white, chromatic, and black pigments, and in combination with all typical additives and stabilizers. Plastics may be in form of powder, plastic masses, melts or in form of spinning solutions. Suitable plastics include polyolefins, unplasticized and plasticized polyvinyl chloride (PVC), and also all engineering plastics such as acrylonitrile/butadiene/styrene copolymers (ABS), polystyrene, polyamide, polyester, polycarbonate, polyetherketone, and also polyurethanes and rubber systems.

Preferably, the pigment composition is used for pigmenting polyolefins such as polyethylene (HDPE, HDPE-HMW, HDPE-UHMW, LDPE, LLDPE, VLDPE, ULDPE), polypropylene, polybutylene, polyisobutylene and poly-4-methyl-1-pentene, polyolefin copolymers, cycloolefin copolymers, polytetrafluoroethylene (PTFE) or ethylene/tetrafluoroethylene copolymers (ETFE), as well as in polyamides such as nylon[6], nylon[12] or nylon[6,6].

The pigment composition may be incorporated into various application media by techniques common in the art.

The pigment composition may be used in an amount of from 0.01 to 75% by weight, preferably 0.01 to 50% by weight, based on the total weight of the material to be colored.

In a further aspect, the invention relates to the use of a pigment composition, as defined in any aspect herein-before for coloring or pigmenting a coating composition, a paint, a printing ink, a liquid ink, plastics, a film or a fiber. The coating composition may be any decorative coating composition like automotive, architectural or industrial coating composition or a paint, especially a waterborne or a solvent borne coating composition. Preferably, the pigment composition is used as a colorant for an automotive, architectural, industrial coating composition, a paint, a printing ink or plastics, especially polyolefines or polyamides.

In a further aspect, the invention relates to a coating composition, a paint, a printing ink, a liquid ink, plastics, a film or a fiber, which is colored or pigmented with a pigment composition, as defined in any aspect herein-before.

In a further aspect, the invention relates to a process for coloring or pigmenting a coating composition, paint, a printing ink, a liquid ink, plastics, a film or a fiber, which process comprises adding thereto a pigment composition, as defined in any aspect herein-before.

The pigment compositions of the invention are excellent in their chemical resistance, in particular in their alkali resistance, wherein the other coloristic and performance properties are not adversely affected. The instant pigment compositions show significantly improved alkali resistance compared to a pigment of formula (I) without modifying with an adduct of component (b) or compared to a physical blend of components (a) and (b). Especially, the hue may be approximately maintained. Also the color strength may be approximately maintained or even improved, dependent on the desired application. Further, the instant pigment compositions show a high chroma and transparency. The efficiency of finishing the pigment of formula (I) is highly improved.

Accordingly, in a further aspect, the invention relates to the use of an adduct (b), as defined in any aspect herein-before, for enhancing the alkali stability of C.I. Pigment Yellow 139, preferably in an application in a high molecular weight organic material.

The pigment compositions of the invention are excellent in their thermal stability in plastics, especially in polyolefin or polyamide plastics. The instant pigment compositions show significantly improved alkali resistance compared to a pigment of formula (I) without modifying with the adduct of component (b). Especially, the hue and color strength can be approximately maintained.

The pigment composition has a significantly reduced amount of pigment of formula (I) compared to other finished pigments of C.I. Pigment Yellow 139. Thus, the instant invention allows providing a pigment composition which reduces costs in preparation and which have similar or even higher color strength and significantly higher alkali resistance. No further finishing step is generally required. A desired color strength may be adapted with a significantly reduced amount of pigment of formula (I).

The definitions and preferences given for the pigment mentioned herein-before apply in any combination as well as in any combination for the other aspects of the invention.

The present invention will now be explained in more detail with reference to the following examples. These examples should not be construed as limited. Unless otherwise stated, "%" is always % by weight.

EXAMPLES

The pigment compositions produced below are evaluated for their alkali stability and colorimetric data in an alkyd melamine paint.

The alkali stability is determined in the paint in white reduction as follows: 1 drop of 2N NaOH solution are deposed on the paint surface and covered with a watch-glass.

The changes in color are observed after 2, 4 and 24 hours. The drops are eliminated therefor with a tissue and rinsed with water.

Evaluation takes place by the following criteria (by visual assessment):
+ good/excellent (no visible change)
0/+ between 0 and +
0 fair (slightly brownish, but acceptable)
0/− between 0 and −
− bad (failed)

To determine the CIELAB values of hue h [°], chroma C* and lightness L*, the coating films obtained (in masstone) are measured using a Minolta Spectrophotometer CM-3610d. Evaluation takes place on the data obtained at a measurement angle of 45°. The color strength is also determined in white reduction.

Example 1 a) 60 g of melamine (2,4,6-triamino-1,3,5-triazine) are dissolved at 45° C. in 600 ml of water (solution A). 60 g of barbituric acid (pyrimidine-2,4,6-trione) are dissolved at 45° C. in 1000 ml of water (solution B). Solution A is slowly added to solution B under stirring. The precipitate of the formed 1:1 adduct of melamine and barbituric acid is isolated by filtration and dried at 60° C. in a vacuum oven.

b) 85 g of Pigment Yellow 139 (crude of Paliotol Yellow K 1841) and 68.7 g of the precipitate of step a) are blended with 340 g of sodium chloride (milled grade) and 142 g of diacetone alcohol and kneaded in a 1 l Z-blade kneader (Meili) for 3 hours at 40° C. The resulting paste is then dispersed in 3 l of water, the product is isolated by filtration, washed salt-free with water and dried in a vacuum oven overnight at 80° C.

Example 2 a) 60 g of melamine (2,4,6-triamino-1,3,5-triazine) are dissolved at 45° C. in 1000 ml of water (solution a). 60 g of cyanuric acid (1,3,5-triazinetriol) are dissolved at 45° C. in 2000 ml of water (solution B). Solution A is slowly added to solution B under stirring. The precipitate of the 1:1 adduct of melamine and cyanuric acid is isolated by filtration and dried at 60° C. in a vacuum oven.

b) 85 g Pigment Yellow 139 (crude of Paliotol Yellow K 1841) and 68.7 g of the precipitate of step a) are blended with 340 g of sodium chloride and 150 g (125 g from the beginning and 25 g are added during the kneading) of diacetone alcohol and kneaded in a 1 l Z-blade kneader for 3 hours at 40° C. The resulting paste is then dispersed in 3 l of water, the product is isolated by filtration, washed salt-free with water and dried in a vacuum oven overnight at 80° C.

Example 3a-3d 50 g of Pigment Yellow 139 (crude of Paliotol Yellow K 1841) and 50 g of a 1:1 adduct of melamine and barbituric acid (prepared according to Example 1a) are dispersed in 450 g of water with a teeth-stirrer for 1 hour at 1000 rpm. A 400 ml glass WAB Willy A. Bachofen DynoMill KDL—equipped with two PU disks, 3000 rpm, filled with 250 ml of Yttrium stabilized Zirkonia pearls (ø 1.2-1.4 mm) is fed—through a peristaltic pump at a speed of 600 ml per min—with 400 ml of water followed by the pigment suspension. The suspension is milled for 3 hours at about 40° C. (Example 3d). Samples are taken after 30 min (Example 3a), 1 hour (Example 3b) and 2 hours (Example 3c). At the end, the product (as well as the intermediate samples) are isolated by filtration, washed with water and dried at 80° C. in a vacuum oven.

Example 4a-4d

The procedure of Example 3 is repeated with the exception that an adduct of melamine and cyanuric acid (prepared according to Example 2a) is used instead of an adduct of melamine and barbituric acid, and the weight ratio of Pigment Yellow 139 to adduct is of 55:45.

Example 5a 50 g of C.I. Pigment Yellow 139 (crude of Paliotol Yellow K 1841) and 50 g of a 1:1 adduct of melamine and barbituric acid (prepared according to Example 1a) are dispersed in 250 g of water in a dissolver (Dispermat) with beads (ø 1.2 to 1.4 mm) for 6 hours at 1000 rpm. The product is isolated by filtration, washed with water and dried at 80° C. in a vacuum oven.

Comparative Example 5b

The procedure of Example 5a is repeated with the exception that the suspension is dispersed without beads (milling media) for 6 hours at 1000 rpm. The product is isolated by filtration, washed with water and dried at 80° C. in a vacuum oven.

Example 6

107.6 g of C.I. Pigment Yellow 139 (crude of Paliotol Yellow K 1841) and 46.1 g of barbituric acid are blended with 340 g of sodium chloride and 133 g of diacetone alcohol in a 1 l Z-blade kneader and kneaded for 3 hours at 40° C. The resulting paste is then dispersed in 3 l of water, the product is isolated by filtration, washed salt-free with water and dried in a vacuum oven overnight at 80° C.

Application Example A

Alkyd Melamine (AM) Paint (Full Shade)

The components are carefully blended during 20 min by 1450 rpm to prepare the alkyd resin A:
150 g of Alkydal F310 (60 wt.-% in SN100) (short oil alkyd resin; Bayer)
47.5 g of xylene (mixture of isomers)
5.0 g of butanol
5.0 g of 1-methoxy-2-propanol
2.5 g of Baysilone MA (1 wt.-% in xylene) (silicone oil; Bayer)

In order to prepare the alkyd melamine paint B
34.27 g of alkyd resin A;
4 g of a pigment composition (Examples 1 to 6);
12 g of DisperByk-161 (dispersant; high molecular weight block copolymer with pigment affinic groups; BYK); and
10.53 g of Maprenal MF650 (cross-linking agent based on a melamine resin; UCB);
are dispersed in a shaker (Skandex) for 1 hour with glass beads (ø 2 mm).

The alkyd melamine paints are applied as full shade on a Leneta black/white contrast carton (wet application of a thickness of 100 μm). After a flash time of 30 min the paints are dried at 120° C. for 30 min.

Application Example B

White Reduction

A white paint containing 74 g of alkyd resin A, 0.5 g of Aerosil 200 (Evonik) and 25 g of TiO$_2$ (Kronos 2310) is used. 4.76 g of the alkyd melamine paint B made in Application Example A are blended with 15.24 g of the white paint.

The paints as white reduction are applied on a Leneta black/white contrast carton (wet application of a thickness of 100 μm), after a flash time of 30 min the paints are dried at 120° C. for 30 min.

Comparative Example 1

Paliotol K 1841 applied with the corresponding amount of the pigment composition.

Comparative Example 2 (Physically Mixed Blend of Pigment Yellow 139 and Adduct)

85 g of Pigment Yellow 139 (crude pigment) and 50 g of a 1:1 adduct of melamine and barbituric acid (prepared according to Example 1a) are dispersed in 450 g of water with a teeth-stirrer for 30 min at 1000 rpm to form a homogenous suspension. The product is isolated by filtration, washed with water and dried at 80° C. in a vacuum oven.

The results of alkali stability tests of the Examples are shown in Table 1. The coloristic data are listed in Table 2.

TABLE 1

(White reduction; Application Example B)

| Pigment composition | Alkali stability after | | | |
|---|---|---|---|---|
| | 0 hours | 2 hours | 4 hours | 24 hours |
| Ex. 1b | + | + | + | + |
| Ex. 2b | + | + | + | + |
| Ex. 3a | + | 0/+ | 0/+ | 0/+ |
| Ex. 3b | + | 0/+ | 0/+ | 0/+ |
| Ex. 3c | + | + | + | + |
| Ex. 3d | + | + | + | + |
| Ex. 4a | + | 0/+ | 0/+ | 0/+ |
| Ex. 4b | + | 0/+ | 0/+ | 0/+ |
| Ex. 4c | + | + | + | + |
| Ex. 4d | + | + | + | + |
| Ex. 5a | + | + | + | + |
| Comp. Ex. 5b | + | 0/− | 0/− | 0/− |
| Ex. 6 | + | + | + | + |
| Comp. Ex. 1 | + | − | − | − |
| Comp. Ex. 2 | + | − | − | − |

TABLE 2

(White reduction; Application Example B)

| Pigment composition | Content of pigment (a) (wt. %) | Color strength | Intrinsic color strength** |
|---|---|---|---|
| Comp. Ex. 1 | 100 | 100* | 100 |
| Comp. Ex. 2 | 55 | 55 | 100 |

TABLE 2-continued (White reduction; Application Example B)

| Pigment composition | Content of pigment (a) (wt. %) | Color strength | Intrinsic color strength** |
|---|---|---|---|
| Ex. 1b | 55 | 119 | 216 |
| Ex. 6 | 70 | 108 | 154 |

*Color strength of Comp. Ex. 1a as a reference (= 100)
**Color strength re-calculated for 100 wt % pigment Application Example D Heat Stability in Polypropylene in Full Shade (0.1 wt.-%)

1 g of a pigment prepared according to Example 2b is blended with 1000 g of polypropylene HF420 FB (*Borealis*) on a Turbula (Fuchs) during 20 min. The blend is extruded in a Twin Screw 25 mm extruder (Collin, Ebersberg) at 200° C. (temperature profile: cold, 150° C., 195° C., 200° C., 200° C., 200° C., 200° C.). The spaghettis are granulated in a granulator (Sheer, Stuttgart) and then injected in the injection molding Boy 30A (Dr. Boy GmbH, Neustadt) following the scheme:

2 min at 200° C., 5 min at 220° C., 5 min at 240° C., 5 min at 260° C., 5 min at 280° C., 5 min at 300° C.; mold 40° C.

The results of the heat stability test of Example 2b are shown in Table 3.

TABLE 3

(full shade; Application Example D)

| Pigment comp. | ΔE 200° C. | ΔE 220° C. | ΔE 240° C. | ΔE 260° C. | ΔE 280° C. | ΔE 300° C. |
|---|---|---|---|---|---|---|
| Ex. 1b | 0 | 1.8 | 4.1 | 7.2 | 15.7 | 19.3 |
| Ex. 2b | 0 | 1.5 | 2.8 | 6.6 | 6.7 | 11.7 |
| Comp. Ex. 1 | 0 | 3.4 | 8.2 | 19.1 | 31.9 | 25.3 |

The pigment composition of Example 1 b shows a significantly improved thermal stability up to about 260° C., the pigment composition of Example 2b shows a significantly improved thermal stability up to about 280° C. in polypropylene.

The invention claimed is:

1. A pigment composition, comprising:
(a) a pigment of formula (I):

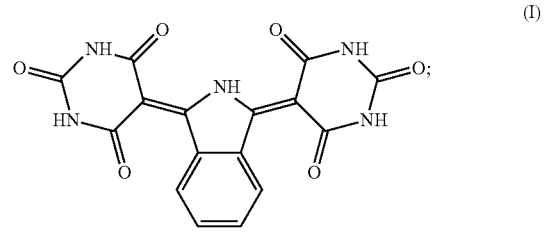 [SMILES: O=C1NC(=O)C(=c2[nH]c(=C3C(=O)NC(=O)NC3=O)c3ccccc23)C(=O)N1]

and
(b) an adduct selected from the group consisting of
(b1) an adduct comprising:
a compound of formula (II):

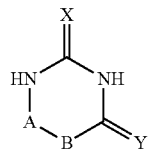
(II)

or a tautomeric form thereof,
wherein
X is O, S or NR$^1$;
Y is O, S or NR$^1$;
—A-B— is selected from the group consisting of —CR$^2$=CR$^3$—, —CR$^4$R$^5$—CR$^6$R$^7$—, —CY—CR$^8$R$^9$—, —CX—NR$^{10}$—, —CR$^{11}$=N—, —CR$^{12}$R$^{13}$—NR$^{14}$— and

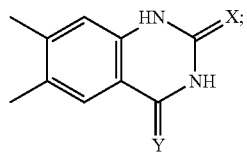

R$^1$ is hydrogen, C$_1$-C$_8$alkyl, C$_3$-C$_7$cycloalkyl, C$_6$-C$_{10}$aryl or C$_7$-C$_{10}$aralkyl;
R$^2$, R$^3$, R$^4$, R$^5$, R$^6$, R$^7$, R$^8$, R$^9$, R$^{10}$, R$^{11}$, R$^{12}$, R$^{13}$ and R$^{14}$ are independently of each other hydrogen, halogen, C$_1$-C$_8$alkyl, C$_2$-C$_8$alkenyl or C$_6$-C$_{10}$aryl, or
R$^2$ and R$^3$ form a benzoannellated ring;
said alkyl, cycloalkyl or alkenyl is unsubstituted or substituted with halogen or OH;
said aryl or benzoannellated ring is unsubstituted or substituted with halogen, OH or C$_1$-C$_4$alkyl; and
a compound of formula (III):

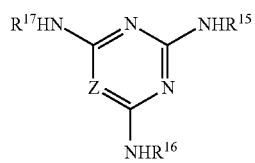
(III)

or a tautomeric form thereof,
wherein
Z is N or CR$^{18}$;
R$^{18}$ is hydrogen, C$_1$-C$_8$alkyl, C$_2$-C$_8$alkenyl, C$_6$-C$_{10}$aryl or C$_7$-C$_{10}$aralkyl;
R$^{15}$, R$^{16}$ and R$^{17}$ are independently of each other hydrogen, C$_1$-C$_8$alkyl, C$_6$-C$_{10}$aryl, C$_7$-C$_{10}$aralkyl or a group of formula (IV):

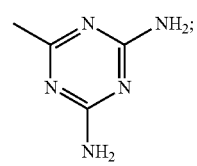
(IV)

said alkyl or alkenyl is unsubstituted or substituted with halogen or OH; and
said aryl is unsubstituted or substituted with halogen, OH or C$_1$-C$_4$alkyl; or
(b2) an adduct comprising:
a compound of formula (II):

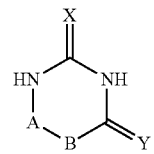
(II)

or a tautomeric form thereof,
wherein
X is O, S or NR$^1$;
Y is O, S or NR$^1$;
—A-B— is selected from the group consisting of —CR$^2$=CR$^3$—, —CR$^4$R$^5$—CR$^6$R$^7$—, —CY—CR$^8$R$^9$—, —CX—NR$^{10}$—, —CR$^{11}$=N—, —CR$^{12}$R$^{13}$—NR$^{14}$— and

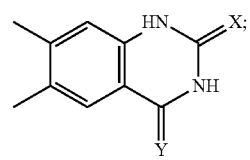

R$^1$ is hydrogen, C$_1$-C$_8$alkyl, C$_3$-C$_7$cycloalkyl, C$_6$-C$_{10}$aryl or C$_7$-C$_{10}$aralkyl;
R$^2$, R$^3$, R$^4$, R$^5$, R$^6$, R$^7$, R$^8$, R$^9$, R$^{10}$, R$^{11}$, R$^{12}$, R$^{13}$ and R$^{14}$ are independently of each other hydrogen, halogen, C$_1$-C$_8$alkyl, C$_2$-C$_8$alkenyl or C$_6$-C$_{10}$aryl, or
R$^2$ and R$^3$ form a benzoannellated ring;
said alkyl, cycloalkyl or alkenyl is unsubstituted or substituted with halogen or OH;
said aryl or benzoannellated ring is unsubstituted or substituted with halogen, OH or C$_1$-C$_4$alkyl; and
(b3) an adduct comprising:
a compound of formula (III):

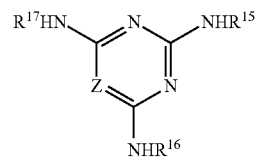
(III)

or a tautomeric form thereof, wherein

Z is N or $CR^{18}$;

$R^{18}$ is hydrogen, $C_1$-$C_8$alkyl, $C_2$-$C_8$alkenyl, $C_6$-$C_{10}$aryl or $C_7$-$C_{10}$aralkyl;

$R^{15}$, $R^{16}$ and $R^{17}$ are independently of each other hydrogen, $C_1$-$C_8$alkyl, $C_6$-$C_{10}$aryl, $C_7$-$C_{10}$aralkyl or a group of formula (IV):

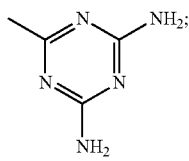

(IV)

said alkyl or alkenyl is unsubstituted or substituted with halogen or OH; and said aryl is unsubstituted or substituted with halogen, OH or $C_1$-$C_4$alkyl.

2. The pigment composition according to claim 1, comprising the adduct (b1) which comprises:

the compound of formula (II) or a tautomeric form thereof, wherein

X and Y are O;

—A-B— is —CY—$CR^8R^9$— or —CX—$NR^{10}$—;

$R^8$, $R^9$ and $R^{10}$ are hydrogen; and the compound of formula (III) or a tautomeric form thereof, wherein Z is N; and $R^{15}$, $R^{16}$ and $R^{17}$ are independently of each other hydrogen or $C_1$-$C_4$alkyl.

3. The pigment composition according to claim 1, comprising the adduct (b1) which comprises:

the compound of formula (II) or a tautomeric form thereof, wherein

X and Y are O;

—A-B— is —CY—$CR^8R^9$— or —CX—$NR^{10}$—;

$R^8$, $R^9$ and $R^{10}$ are hydrogen; and the compound of formula (III) or a tautomeric form thereof, wherein Z is $CR^{18}$;

$R^{18}$ is hydrogen, $C_1$-$C_4$alkyl, phenyl or $C_7$-$C_{10}$aralkyl; and $R^{15}$, $R^{16}$ and $R^{17}$ are independently of each other hydrogen or $C_1$-$C_4$alkyl.

4. The pigment composition according to claim 1, comprising the adduct (b1) which comprises:

the compound of formula (II) or a tautomeric form thereof, wherein

X and Y are O;

—A-B— is —CY—$CR^8R^9$— or —CX—$NR^{10}$—;

$R^8$, $R^9$ and $R^{10}$ are hydrogen; and the compound of formula (III) or a tautomeric form thereof, wherein Z is N; and $R^{15}$, $R^{16}$ and $R^{17}$ are hydrogen.

5. The pigment composition according to claim 1, comprising the adduct (b3) which comprises:

the compound of formula (III) or a tautomeric form thereof; and a compound of formula (V):

$$HOOC—R^{19}—COOH \qquad (V),$$

wherein $R^{19}$ is a direct bond, $C_1$-$C_8$alkylene, $C_2$-$C_8$alkenylene, $C_3$-$C_7$cycloalkylene or $C_6$-$C_{10}$arylene;

said alkylene, cycloalkylene or alkenylene is unsubstituted or substituted with halogen or OH, and said alkylene may further be interrupted by O, S, $NR^{20}$, phenyl, naphthyl or cyclohexylene, said arylene is unsubstituted or substituted with halogen, OH or $C_1$-$C_4$alkyl; and $R^{20}$ is hydrogen or $C_1$-$C_4$alkyl.

6. The pigment composition according to claim 1, wherein the mole ratio of compound of formula (II) to compound of formula (III), or the mole ratio of compound of formula (III) to compound of formula (V) is of from 0.4:0.6 to 0.7:0.3.

7. The pigment composition according to claim 1, comprising the adduct (b2) which comprises the compound of formula (II) or a tautomeric form thereof, wherein X and Y are O;

—A-B— is selected from the group consisting of —$CR^2$=$CR^3$—, —CY—$CR^8R^9$— and —CX—$NR^{10}$—;

$R^2$, $R^3$ and $R^{10}$ are hydrogen; and $R^8$ and $R^9$ are independently of each other hydrogen, halogen or $C_1$-$C_4$alkyl.

8. The pigment composition according to claim 1, wherein the weight ratio of component (a) to component (b) is of from 0.85:0:15 to 0.5:0.5.

9. The pigment composition according to claim 1, consisting essentially of component (a) and component (b).

10. A process for preparing a pigment composition of claim 1, the process comprising treating the pigment (a) of formula (I) with the adduct (b) to obtain the pigment composition.

11. The process according to claim 10, wherein the pigment (a) of formula (I) is treated with the adduct (b) by salt kneading, wet milling or dispersing, wherein optionally the adduct is prepared in situ during the treating step.

12. A pigment composition obtained by the process of claim 10.

13. A process for coloring a composition, the process comprising adding the pigment composition of claim 1 to a composition selected from the group consisting of a coating composition, a paint, a printing ink, a liquid ink, plastics, a film and a fiber.

14. A colored composition, comprising:

the pigment composition of claim 1 as a colorant; and a composition selected from the group consisting of a coating composition, a paint, a printing ink, a liquid ink, plastics, a film and a fiber.

15. A process for coloring a composition, the process comprising adding the pigment composition of claim 9 to a composition selected from the group consisting of a coating composition, a paint, a printing ink, a liquid ink, plastics, a film and a fiber.

16. A process for enhancing alkali stability of a pigment of formula (I):

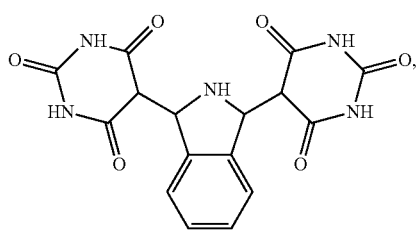 (I)

the process comprising adding an adduct to the pigment of formula (I), said adduct being selected from the group consisting of (b1) an adduct comprising:
a compound of formula (II):

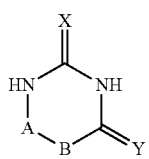 (II)

or a tautomeric form thereof,
wherein
X is O, S or $Nr^1$;
Y is O, S or $NR^1$;
—A-B— is selected from the group consisting of —$CR^2$=$CR^3$—, —$CR^4R^5$—$CR^6R^7$—, —CY—$CR^8R^9$—, —CX—$NR^{10}$—, —$CR^{11}$=N—, —$CR^{12}R^{13}$—$NR^{14}$— and

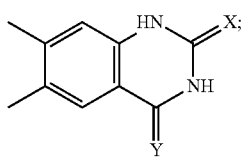

$R^1$ is hydrogen, $C_1$-$C_8$alkyl, $C_3$-$C_7$cycloalkyl, $C_6$-$C_{10}$aryl or $C_7$-$C_{10}$aralkyl;
$R^2$, $R^3$, $R^4$, $R^5$, $R^6$, $R^7$, $R^8$, $R^9$, $R^{10}$, $R^{11}$, $R^{12}$, $R^{13}$ and $R^{14}$ are independently of each other hydrogen, halogen, $C_1$-$C_8$alkyl, $C_2$-$C_8$alkenyl or $C_6$-$C_{10}$aryl, or
$R^2$ and $R^3$ form a benzoannellated ring;
said alkyl, cycloalkyl or alkenyl is unsubstituted or substituted with halogen or OH;
said aryl or benzoannellated ring is unsubstituted or substituted with halogen, OH or $C_1$-$C_4$alkyl; and
a compound of formula (III):

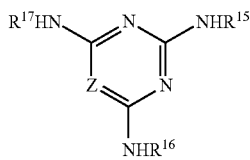 (III)

or a tautomeric form thereof, wherein
Z is N or $CR^{18}$;
$R^{18}$ is hydrogen, $C_1$-$C_8$alkyl, $C_2$-$C_8$alkenyl, $C_6$-$C_{10}$aryl or $C_7$-$C_{10}$ aralkyl;
$R^{15}$, $R^{16}$ and $R^{17}$ are independently of each other hydrogen, $C_1$-$C_8$alkyl, $C_6$-$C_{10}$aryl, $C_7$-$C_{10}$aralkyl or a group of formula (IV):

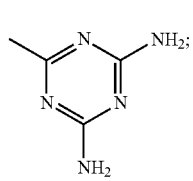 (IV)

said alkyl or alkenyl is unsubstituted or substituted with halogen or OH; and
said aryl is unsubstituted or substituted with halogen, OH or $C_1$-$C_4$alkyl; or (b2) an adduct comprising:
a compound of formula (II):

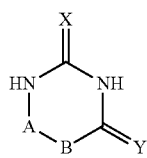 (II)

or a tautomeric form thereof,
wherein
X is O, S or $NR^1$;
Y is O, S or $NR^1$;
—A-B— is selected from the group consisting of —$CR^2$=$CR^3$—, —$CR^4R^5$—$CR^6R^7$—, —CY—$CR^8R^9$—, —CX—$NR^{10}$—, —$CR^{11}$=N—, —$CR^{12}R^{13}$—$NR^{14}$— and

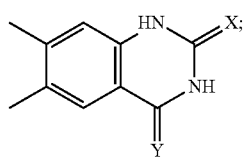

$R^1$ is hydrogen, $C_1$-$C_8$alkyl, $C_3$-$C_7$cycloalkyl, $C_6$-$C_{10}$aryl or $C_7$-$C_{10}$aralkyl;
$R^2$, $R^3$, $R^4$, $R^5$, $R^6$, $R^7$, $R^8$, $R^9$, $R^{10}$, $R^{11}$, $R^{12}$, $R^{13}$ and $R^{14}$ are independently of each other hydrogen, halogen, $C_1$-$C_8$alkyl, $C_2$-$C_8$alkenyl, or $C_6$-$C_{10}$aryl, or
$R^2$ and $R^3$ form a benzoannellated ring;
said alkyl, cycloalkyl or alkenyl is unsubstituted or substituted with halogen or OH,
said aryl or benzoannellated ring is unsubstituted or substituted with halogen, OH or $C_1$-$C_4$alkyl; and (b3) an adduct comprising:
a compound of formula (III):

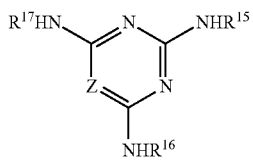

or a tautomeric form thereof,
wherein
Z is N or $CR^{18}$;
$R^{18}$ is hydrogen, $C_1$-$C_8$alkyl, $C_2$-$C_8$alkenyl, $C_6$-$C_{10}$aryl or $C_7$-$C_{10}$aralkyl;

$R^{15}$, $R^{16}$ and $R^{17}$ are independently of each other hydrogen, $C_1$-$C_8$alkyl, $C_6$-$C_{10}$aryl, $C_7$-$C_{10}$aralkyl or a group of formula (IV):

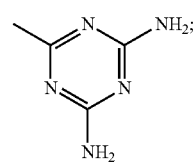

said alkyl or alkenyl is unsubstituted or substituted with halogen or OH; and
said aryl is unsubstituted or substituted with halogen, OH or $C_1$-$C_4$alkyl.

* * * * *

UNITED STATES PATENT AND TRADEMARK OFFICE
CERTIFICATE OF CORRECTION

PATENT NO. : 9,982,137 B2  
APPLICATION NO. : 15/513456  
DATED : May 29, 2018  
INVENTOR(S) : Philippe Bugnon et al.

Page 1 of 1

It is certified that error appears in the above-identified patent and that said Letters Patent is hereby corrected as shown below:

In the Claims

Column 27, Lines 1-10, " 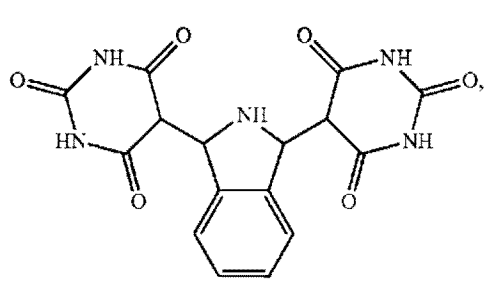 " should read 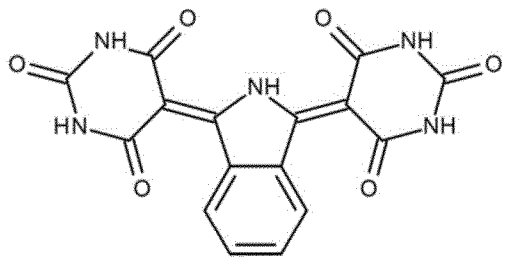 (I) --

Column 27, Line 30, "X is O, S or Nr¹" should read --X is O, S or NR$^1$--

Column 28, Line 5, "–CX–NR$^{10}$–,–CR$^{11}$=N–" should read -- –CX–NR$^{10}$–, –CR$^{11}$=N– --

Signed and Sealed this  
Twenty-seventh Day of August, 2019

Andrei Iancu  
*Director of the United States Patent and Trademark Office*